May 12, 1964     T. C. REID     3,132,626
DISTRESS SIGNAL DEVICE

Filed April 9, 1963     3 Sheets-Sheet 1

INVENTOR.
THEODORE C. REID

BY Kimmel & Crowell
ATTORNEYS

May 12, 1964     T. C. REID     3,132,626
DISTRESS SIGNAL DEVICE
Filed April 9, 1963     3 Sheets-Sheet 2
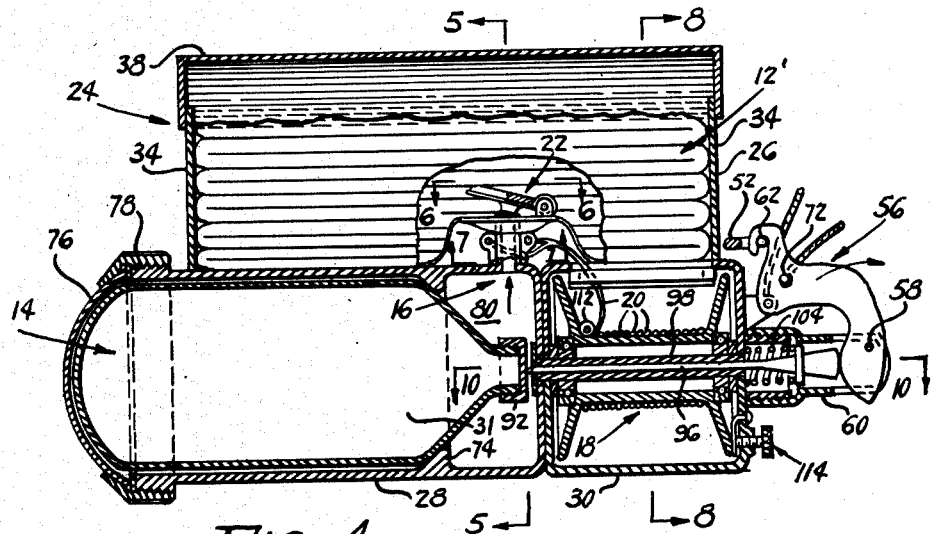
FIG. 4
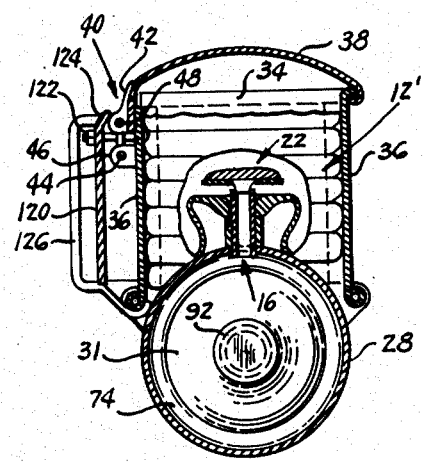
FIG. 5
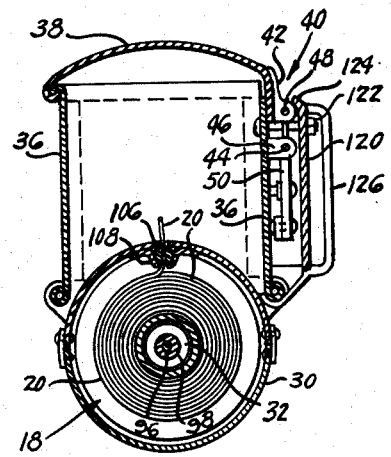
FIG. 8
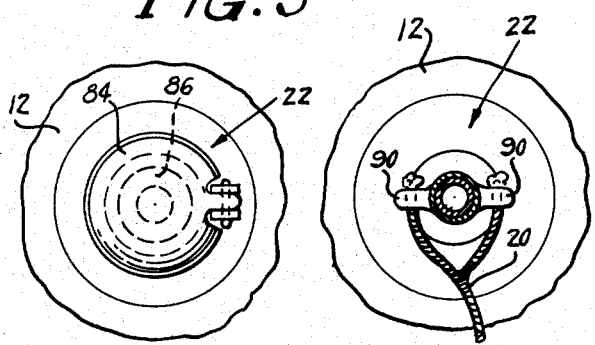
FIG. 6     FIG. 7     FIG. 9
INVENTOR.
THEODORE C. REID
BY 
ATTORNEYS.

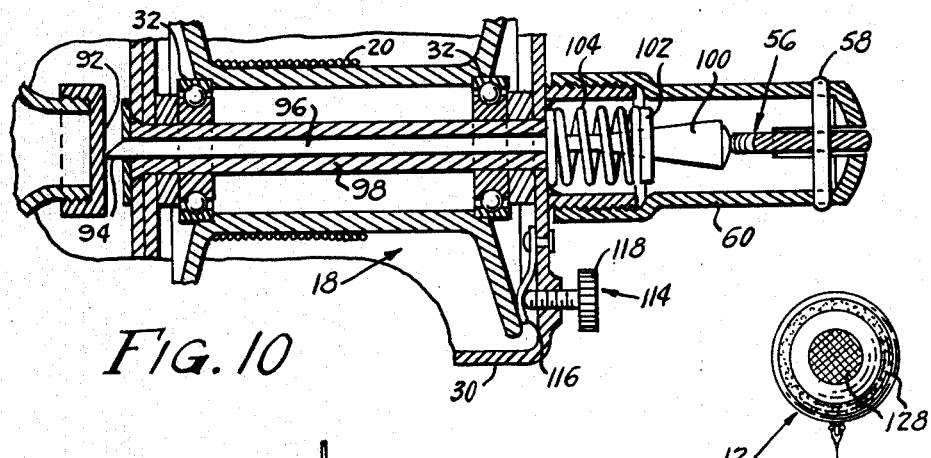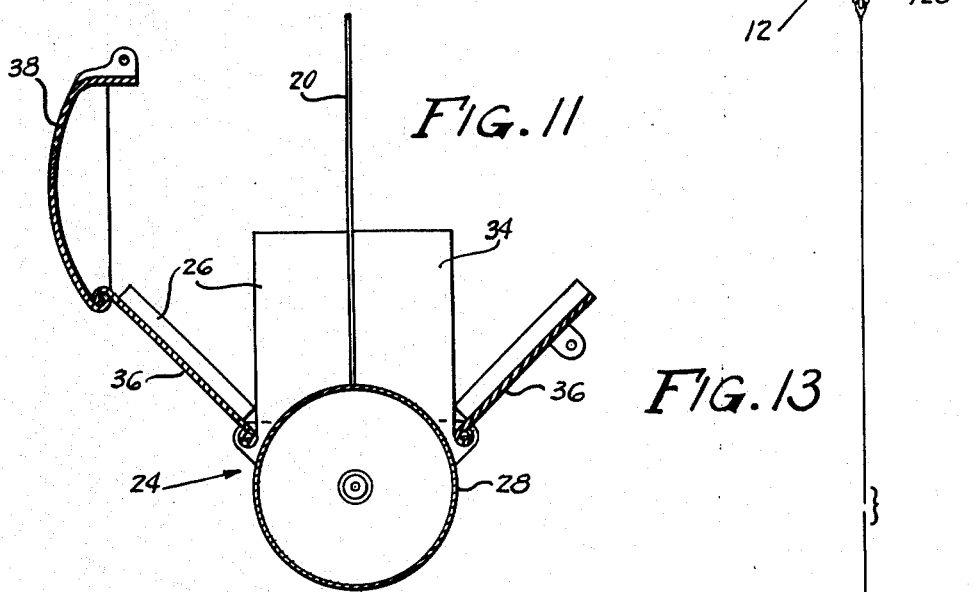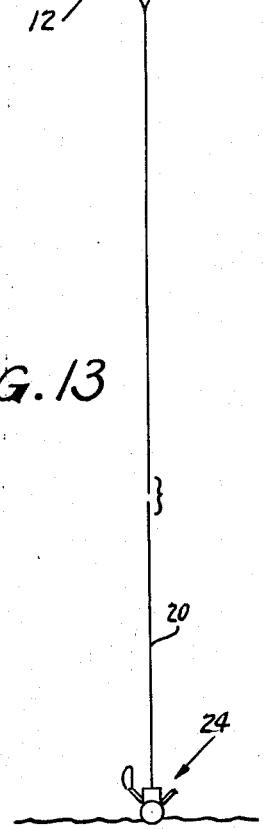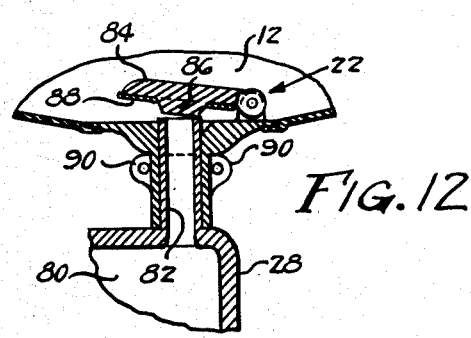

United States Patent Office 3,132,626
Patented May 12, 1964

3,132,626
DISTRESS SIGNAL DEVICE
Theodore C. Reid, 3887 12th St., Sacramento 22, Calif.
Filed Apr. 9, 1963, Ser. No. 271,622
3 Claims. (Cl. 116—124)

This invention relates to a distress signal device and relates more particularly to a device having a balloon which may be easily and quickly inflated for providing an indication of distress or for marking the position of an individual.

The primary object of the instant invention is to provide an improved signal device which is sturdy and durable in construction, reliable and efficient in operation, and relatively simple and inexpensive to manufacture, assemble, utilize, and maintain.

Another object of the instant invention is to provide a signal device which is readily accessible and easily operated to alert rescuers and to fix the location of those in distress as a guide in seeking persons or objects down or lost in waters or wooded areas or other rugged terrain.

A further object of the instant invention is the provision of such a device which may be readily carried by an aircraft, lifeboat or the like, or by an individual hunter or camper.

A still further object of this invention is the provision of a distress signal device having a source of inflating gas such as a pressurized gas bottle and means to puncture the same for releasing the gas to inflate a balloon which is secured to the device and will rise in the air as a visual indicator of the position of the object carrying the signal.

Another object of the instant invention is to provide a signal device carrying a rotatably mounted reel of line secured to the balloon to avoid tangling or fouling of the same.

A further object of the instant invention is the provision of a device of the type described wherein means are provided to adjustably regulate the rate and height of ascent of the balloon.

Other and further objects reside in the combinations of elements, arrangements of parts, and features of construction.

Still other objects will in part be obvious and in part be pointed out as the description of the invention proceeds and as shown in the accompanying drawings wherein:

FIGURE 4 is a longitudinal cross-sectional view of the device as shown in FIGURE 2, with parts broken away for illustrative clarity;

FIGURE 5 is a transverse cross-sectional view taken substantially on line 5—5 of FIGURE 4, with parts thereof broken away;

FIGURE 6 is an enlarged fragmentary view taken on line 6—6 of FIGURE 4 and showing a top plan view of the valve means in accordance with the instant invention;

FIGURE 7 is an enlarged fragmentary cross-sectional view taken substantially on line 7—7 of FIGURE 4 and showing a bottom view of the valve means;

FIGURE 8 is a transverse cross-sectional view taken substantially on line 8—8 of FIGURE 4;

FIGURE 9 is an enlarged detail view of a guide means for paying out the line attached to the balloon of the instant invention;

FIGURE 10 is an enlarged fragmentary cross-sectional view taken substantially on line 10—10 of FIGURE 4;

FIGURE 11 is a transverse cross-sectional view of the device of the instant invention in open relationship, with parts broken away for illustrative clarity;

FIGURE 12 is an enlarged cross-sectional detail view of the valve means, with parts broken away for illustrative clarity; and FIGURE 13 is a schematic view of the distress signal device of the instant invention with the balloon in operative position.

Similar reference characters refer to similar parts throughout the several views of the drawings.

Figure 1:
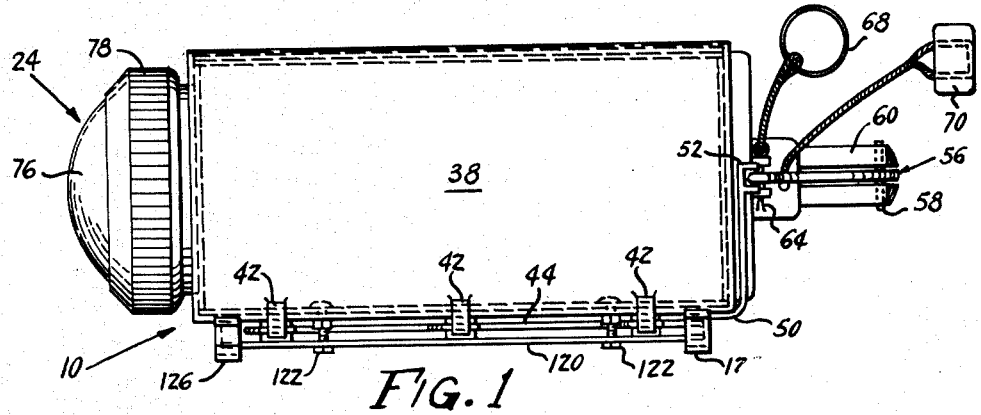
FIGURE 1 is a top plan view of a distress signal device in accordance with the instant invention.
Figure 2:
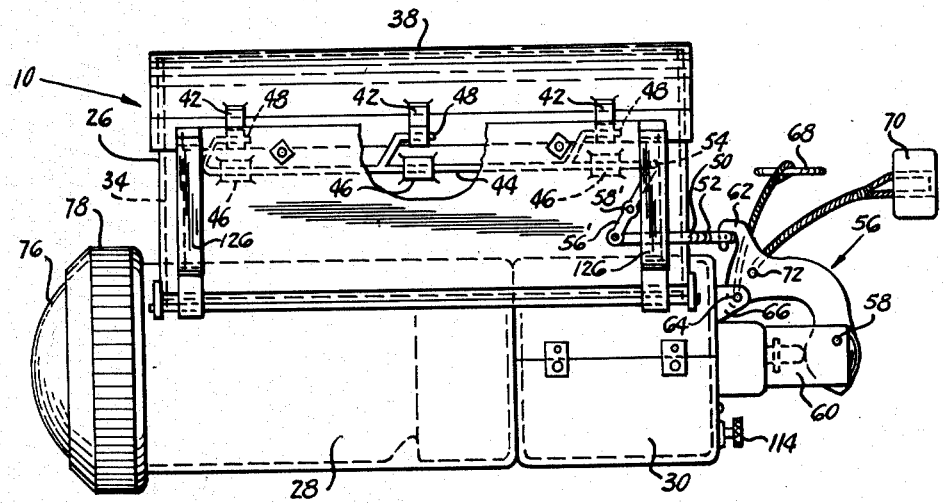
FIGURE 2 is a side elevational view of the device of FIGURE 1, with parts broken away for illustrative clarity.
Figure 3:
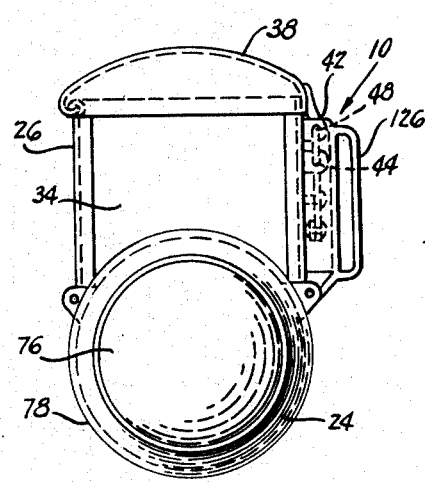
FIGURE 3 is an end elevational view thereof.

Referring now to the drawings in general and more particularly to FIGURES 1 to 4, reference numeral 10 designates generally a distress signal device in accordance with the instant invention. The device 10 comprises basically an inflatable balloon 12, a source of inflating gas 14, passage means 16 between the source 14 and the balloon 12, a reel means 18 windingly receiving a balloon line 20, a valve means 22 for sealing the balloon 12 after it has been inflated by gas from the source 14 and a container means 24 for receiving each of the aforementioned elements.

The container means 24 has a first compartment 26 for storing the balloon 12 in collapsed relationship as shown at 12′ in FIGURES 4 and 5, a second compartment 28 for receiving a pressurized bottle 31 of inflating gas such as hydrogen, helium, or the like and forming the source 14 of inflating gas, and a third compartment 30 in which the reel means 18 is rotatably mounted on bearings 32 or the like. (Note particularly FIGURE 10.)

The first compartment 26 of the container means 24 includes fixed opposed end members 34, pivotally mounted, opposed side members 36, and a top member 38 pivotally mounted on one of the side members 36. These elements are movable between a closed relationship as shown particularly in FIGURES 1 to 5 and 8 and an opened relationship as shown in FIGURE 11. A locking means 40 comprises a plurality of apertured ear members 42 secured to a depending flange portion of the top member 38 and a locking pin 44 slidably secured in apertured ear members 46 on side member 36 of the first compartment 26 and having portions 48 engageable with the apertured ear members 42 to lock the first compartment 26 in closed relationship. An arm member 50 has a first end portion 52 defining an eye member and a second end portion pivotally mounted to a link member 56′ pivotally supported at 58′ and having an end portion 54 engaging the locking pin 44 for sliding the same within the ear members 46 to disengage the portions 48 from the apertured ears 42 to thereby release the locking means 40 and allow the side and top members 36 and 38, respectively, to pivot to the opened relationship shown in FIGURE 11 as the balloon 12 is inflated. A lever means 56 is pivotally supported at 58 in a bifurcated support member 60 secured to the container means 24 and has a portion 62 defining a hook member engageable with the eye member 52 on the arm member 50. A safety pin 64 engages through an apertured ear 66 on the container means 24 and is removable by pulling a ring member 68 to thereby release the lever means 56 for pivotal movement. A handle means 70 is secured to the lever means 56 at 72 to facilitate pivoting the same thereby releasing the locking means in the aforementioned manner.

The second compartment 28 has an internal ridge 74 dimensioned to receive the gas bottle 31 and a removable end member 76 threadably secured by a sleeve 78 to allow for readily replacing the gas bottle 31. The passage means 16 includes a portion of the second compartment 28 defining a gas receiving cavity 80 communicating with a tube means 82 slidably receiving the valve means 22 thereon and carrying the gas into the interior of the balloon 12. The valve means 22 has a pivotally mounted sealing member 84 having a downwardly extending frusto-conical portion 86 receivable within the mouth of the balloon 12 and a coating of a sealing compound at 88 to lock and seal the balloon against loss of gas from within. Portions of the tube means 82 extend sufficiently within the balloon 12 to maintain the valve means 86 in an opened position during the inflating procedure. When the balloon 12 is slid free of the tube means 82, the valve means 22 is closed by the internal pressure within the balloon. A pair of apertured ear members 90 are affixed to the mouth of the balloon 12 for reception of the balloon line 20. (Note particularly FIGURE 7.)

The gas bottle 31 has an open top with a cap 92 formed of a material penetrable by a sharpened end 94 on a plunger means 96 slidably mounted within a tube 98 passing through the center of the reel means 18 in the third compartment 30. The plunger means 96 has an enlarged head portion 100 with an annular disc 102 bearing against a spring means 104 normally biasing the plunger means 96 out of penetrating engagement with the cap 92. A further portion of the lever means 56 engages the enlarged head 100 and slides said plunger means 96 toward said cap 92 to puncture the same with the sharpened end 94 when the lever means 56 is pivoted about its mounting 58 by pulling on the handle means 70. It will be noted that the simple action of pivoting the lever means 56 will puncture the cap on the gas bottle 31 and replace the locking means 40 so that the balloon 12 can escape from the first compartment 26 of the container means 24 as soon as it is inflated. The spring means 104 returns the plunger means 96 to its original position thereby withdrawing the sharpened end 94 from the cap 92 providing an aperture for the passage of gas from within the bottle 31 into the gas receiving cavity 80.

The balloon line 20 is payed off the reel means 18 through the guide means 106 slidably received in a guide housing 108 having a guide slot 110 communicating with the first compartment 24. An apertured ear 112 on the reel means 18 is provided for securing the balloon to line 20. A braking means 114 frictionally engages the reel means 18 and allows for varying the rate and height of ascent of the balloon 12. Referring particularly to FIG. 10, the braking means 114 includes a braking member 116 in engagement with the side of the reel means 18 and a threadably secured screw means 118 for adjustably pressing the braking member 116 into engagement with the reel means 18. Ascent of the balloon 12 may be completely stopped by a sufficiently tight engagement of the braking means 114 and the rate of ascent may be varied in an obvious manner.

A guard plate 120 is pivotally secured substantially parallel to the side member 36 of the first compartment 26 having the ears 46 slidingly supporting the locking pin 44. The guard plate 120 may be bolted to the side plate 36 by nut and bolt means 122 and in normal operation covers the locking means 40 to protect the same against damage. An inturned lip 124 engages over the apertured ears 42 on the top member 38 and the latter element may be released for opening by slightly loosening the nut and bolt means 122 so that the apertured ears 42 can slide free of the lip 124.

Any desirable securing means may be provided for affixing the distress signal device to the object carrying the same. For example, it may removably be secured to an airplane, a lifeboat or raft, or other such means wherein the occupants may be placed in a position of danger due to a crash or the like or a pair of apertured members such as 126 may be provided for reception of a belt or other portion of apparel of a hunter or fisherman so that it may be carried on his person for instantaneous use if necessary.

The balloon 12 may be of any desired size or shape depending upon the particular application to which the device is to be put. It is preferably made of a light weight, tough plastic material which will not deteriorate in the presence of dampness and will not cling together when compacted. It has been found that such a material as Mylar, a product of Du Pont, is particularly useful for this purpose. The exterior of the balloon may be colored or designed in any particular manner as shown at 128 in FIGURE 13 to improve visibility and if the device is to be used in the nighttime, the design may be formed with a luminous material to facilitate visibility. Also, a metallic material may be used to design the balloon 12 to facilitate radar detection thereof.

The use and operation of the device of the instant invention will now be apparent. Depending upon the particular environment in which the device is to be used, it may be placed in a relatively open area if one is available and the safety pin 64 may be disengaged by pulling the ring 68 thereby releasing the lever means 56 for pivoting about its mounting at 58 by pulling on the handle means 70. Such action will puncture the cap 92 on the gas bottle 31 and simultaneously release the locking means 40. The spring means 104 will withdraw the plunger means 96 allowing gas to escape from the bottle 31 and thence through the gas receiving cavity 80 and the tube means 82 to inflate the balloon 12. As the latter element expands the first compartment 26 will be opened to the position of FIGURE 11 so that when the balloon 12 is fully inflated it may be slipped off the tube means 82 to rise to a position where it will be visible to rescuers as shown in FIGURE 13. The valve means 22 will automatically seal the balloon 12 in its inflated relationship as soon as the tube means 82 is withdrawn slightly from the mouth of the balloon 12 to allow the valve means to pivot to its closed position.

It is to be understood that the device of the instant invention may be made of any size and shape depending on its particular use, a smaller device being provided for individual use and a larger device being provided for use with crashed airplanes or the like. It will also be seen that if the device is to be used in a marine atmosphere it must be buoyant so that it will not sink after the balloon is released. If the container means 24 is not buoyant of its own accord, any conventional light material may be secured thereto such as cork or the like.

It will now be seen that there is herein provided an improved distress signal device which satisfies all the objects of the instant invention, and others, including many advantages of great practical utility and commercial importance.

As many embodiments may be made of the instant inventive concept and as many modifications may be made of the embodiments hereinbefore shown and described, it is to be understood that all matter herein is to be interpreted merely as illustrative, and not in a limiting sense.

I claim:

1. A distress signal device comprising container means including a first compartment, a balloon stored in said first compartment in collapsed relationship, a source of inflating gas including a pressurized bottle having an open top with a penetrable cap secured thereover, plunger means having sharpened portions for puncturing said cap, passage means for connecting said source of inflating gas with said interior of said balloon, valve means sealing said balloon after it has been inflated by said gas, and line means securing said balloon to said container means, said first compartment including pivotally mounted closure means, locking means normally securing said closure means in closed relationship, releasing means for disengaging said locking means, and a pivotally mounted lever means including a first portion operatively engaging said plunger means for actuating said plunger means and a second portion operatively connected to said releasing means for actuating said releasing means whereby pivotal movement of said lever means simultaneously causes puncturing of said cap to allow said gas to inflate said balloon and releasing of said locking means to allow said balloon to escape from said container means.

2. A distress signal device in accordance with claim 1 wherein said plunger means is slidably mounted, said first portion of said lever means abuttingly engaging said plunger means, said first portion sliding said plunger means toward said cap to puncture said cap with said sharpened portion when said lever means is pivoted about its mounting, and spring means for withdrawing said sharpened end of said plunger means from said cap to allow said gas to pass from said bottle through said passage means to said interior of said balloon, said closure means including opposed, pivotally mounted, side members and a top member pivotally mounted on one of said side members, said locking means including at least one apertured ear fixed to said top member, and a locking pin slidably mounted on one of said side members for engagement with said apertured ear, said second portion of said lever means defining a hook member, said releasing means including a pivotally mounted arm member having a first end portion defining an eye member for receiving said hook member, and a second end portion on said arm member for sliding said locking pin out of engagement with said apertured ear when said hook member is withdrawn by pivoting said lever means about its mounting.

3. A distress signal device in accordance with claim 1 wherein said container means further includes a second compartment for receiving said source of inflating gas, portions of said second compartment defining a gas receiving cavity, said passage means including a tube means communicating at one end with said cavity and at its other end with said interior of said balloon, said valve means being slidably received over said tube means, said tube means including portions to maintain said valve means in opened relationship while said balloon is being inflated, and said valve means being closed in sealing relationship by the pressure of said gas within said balloon when said valve means is slid free of said tube means after said balloon is inflated.

References Cited in the file of this patent
UNITED STATES PATENTS

| | | |
|---|---|---|
| 1,288,097 | Martin | Dec. 17, 1918 |
| 1,370,178 | Albert | Mar. 1, 1921 |
| 2,118,165 | Christopher et al. | May 24, 1938 |
| 2,690,729 | Maier | Oct. 5, 1954 |
| 2,840,033 | Nitchman | June 24, 1958 |
| 2,882,853 | Reeves | Apr. 21, 1959 |
| 2,894,658 | Spidy | July 14, 1959 |
| 2,923,917 | McPherson et al. | Feb. 2, 1960 |